July 30, 1929.  N. C. RAGSDALE  1,722,481
WINDOW SCREEN FOR AUTOMOBILES
Filed March 24, 1928   2 Sheets-Sheet 1
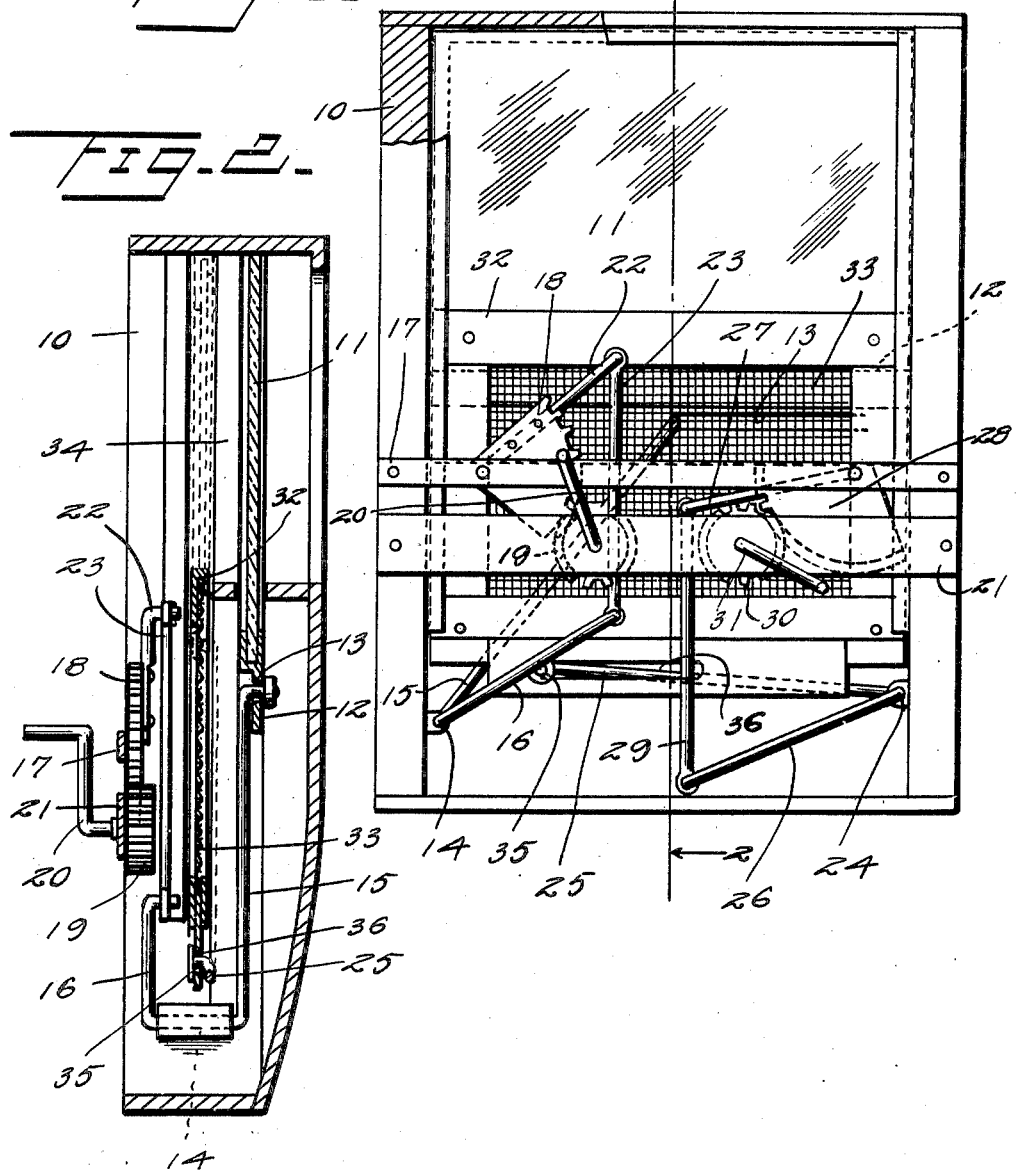
Inventor
N. C. Ragsdale

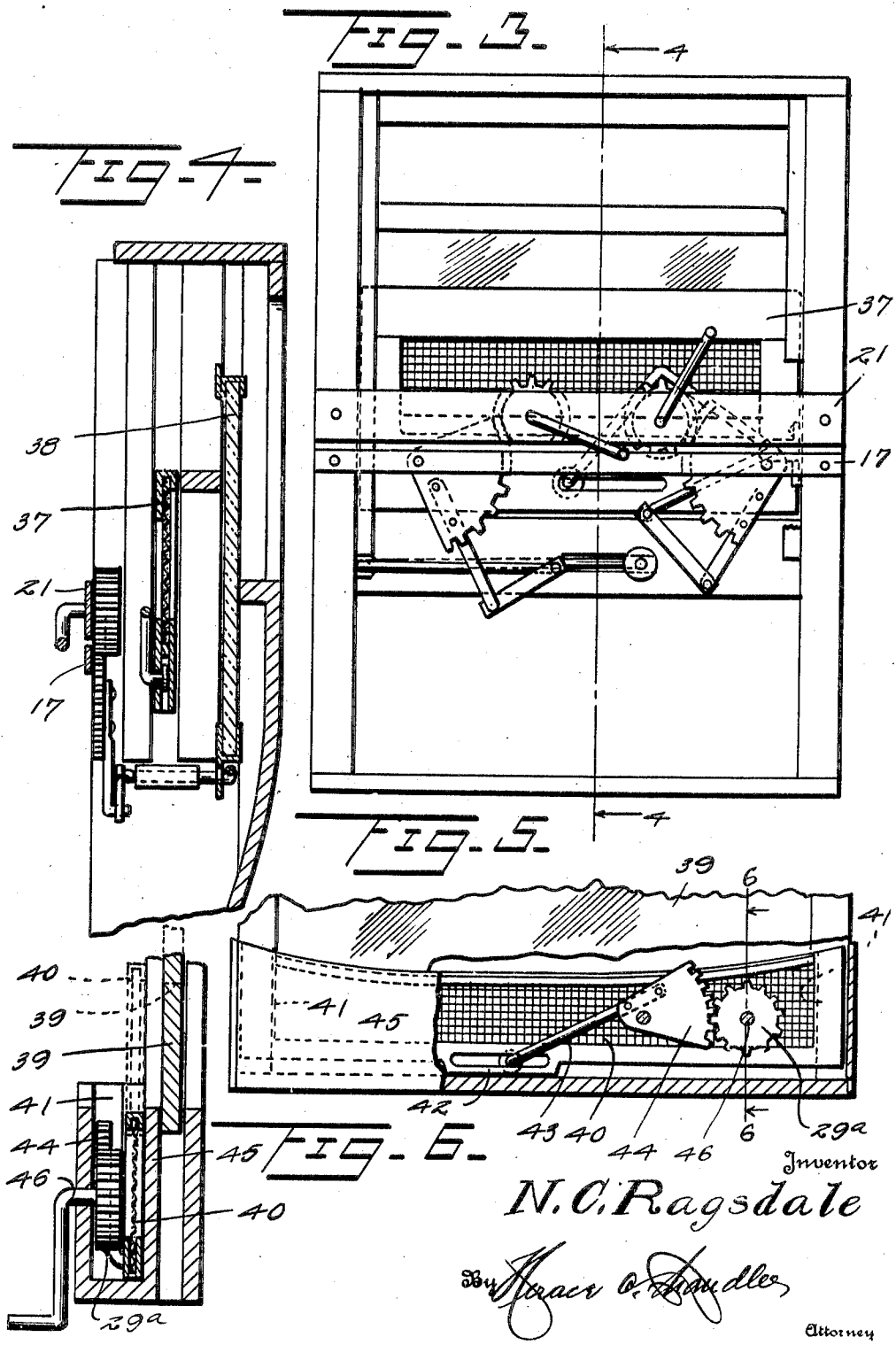

Patented July 30, 1929.

1,722,481

UNITED STATES PATENT OFFICE.

NATHAN C. RAGSDALE, OF SAVANNAH, GEORGIA.

WINDOW SCREEN FOR AUTOMOBILES.

Application filed March 24, 1928. Serial No. 264,529.

This invention relates to new and useful improvements in screens, and particularly to screens for use in connection with automobile windows and doors.

One object of the invention is to provide novel and improved operating mechanism for a screen by means of which the screen may be esaily and quickly moved to close the opening made when a windshield or door glass is opened, whereby to exclude insects, and flying pebbles.

Another object is to provide a device of this character which is simple in construction, easy to operate, and which can be manufactured and applied to an automobile at a comparatively low cost.

Other objects and advantages will be apparent from the following description when taken in connection with the accompanying drawings.

In the drawings:

Figure 1 is an elevation of a portion of the door of an automobile, equipped with the screen, and wherein the glass of the door is adapted to be completely lowered.

Figure 2 is a vertical central sectional view on the line 2—2 of Figure 1.

Figure 3 is an elevation showing a modification of the device which is adapted for use in connection with a side window which does not lower completely.

Figure 4 is a vertical sectional view on the line 4—4 of Figure 3.

Figure 5 is a view showing the use of a screen below the lower edge of the vertically movable glass of the windshield of an automobile of the sedan or closed type.

Figure 6 is a vertical sectional view on the line 6—6 of Figure 5.

Referring to the accompanying drawing, and particularly to Figures 1 and 2, 10 represents the frame of a door of an automobile of the closed type, wherein there is slidably disposed the glass pane 11. To the lower end of the glass there is secured a metal plate 12, in the lower portion of which is formed the longitudinal slot 13. Mounted on one side of the door-frame is a shaft 14, and extending radially from the ends of the shaft, at different circular angles, are the arms 15 and 16, the former of which is somewhat longer than the latter, and is provided with a laterally turned end engaged in said slot 13. Pivotally supported on a cross bar 17, within the frame 10, is a segmental rack 18, with which is engaged the gear 19, carried by a crank shaft 20, and suitably supported on a second cross bar 21. For the purpose of brevity, the bars 17 and 21 will be taken together as constituting a bracket. Secured on the said segment 18 is an arm 22, and pivotally connecting this arm with the arm 16, of the shaft 14, is a link 23, whereby when the crank shaft 20 is rotated, the rack will also be moved to transmit motion to the shaft 14, through the medium of the link 23, to raise the glass of the door. A similar shaft 24 is mounted on the other side of the door frame, and is provided with the long arm 25 and the short arm 26, the former of which is connected with an arm 27 carried by a second segment 28, mounted on the bar 21, by means of the link 29, said segment being driven by the gear 30 on the crank shaft 31 mounted on the cross bar 17. A vertically slidable frame 32, provided with the screen 33, is mounted to slide inwardly of the glass pane, and in conjunction with the felt guides 34, of the said glass. The long arm 25 is terminally bent at right angles, as at 35, and engaged in a slot 36, in the lower portion of the screen frame 32, whereby to permit raising and lowering of said screen. It will be noted that this screen is of a size to completely cover the opening in the door, when the glass is lowered, thereby protecting the occupant from dust and insects.

In the form shown in Figure 3, the device is adapted for the side window, wherein the glass does not lower to the extent that the glass of the door of the automobile is capable of being lowered. In this event the screen frame is considerably shallower, as shown at 37, so as to cover the opening above the lowered glass 38. The mechanism for raising and lowering the glass 38 is identical with that for operating the glass of the first form described, while the mechanism for raising and lowering screen 37 is identical with that described in connection with the screen 32.

The device shown in Figure 4 is especially adapted for use in connection with the vertically slidable glass 39, of the windshield of an automobile. This form consists of a shallow screen frame 40 which is mounted in vertical guides 41, at opposite sides of the windshield, and in the center of the lower edge of such frame there is mounted a depending centrally apertured tab 42, in which is engaged the angularly turned end of the arm 43, carried by the gear segment 44, mounted in the lower portion of the windshield frame 45. This segment is operable by the gear 29 carried by the crank shaft 46, also mounted in said frame. The crank portion of this shaft 46 is disposed within the automobile, within easy reach of the driver, while the operating cranks of the other forms are disposed within easy reach of the occupants of the automobile. When the glass 39 is raised, the driver grasps the crank of the shaft 46, and raises the screen 40 until it abuts the lower edge of the glass, thus closing the opening below said glass, and excluding insects, and flying pebbles from the driver, as well as the person seated beside him.

If desired, the screens of the doors may be raised, while the glasses are also in elevated or closed position, thus providing a protecting screen for the occupants, against flying pieces of glass, in the event of a collision. The chief injuries suffered by the occupants of a closed car, in the event of an accident, is by flying glass, and with the device herein described, the occupant is effectively protected from such injury.

What is claimed is:

In an operating means for the screen frame for an automobile door, said screen frame having a slotted extension on its lower end, a bracket adapted to be mounted in the door, a shaft supported in the bracket and having radially extending arms on its ends arranged at an angle with respect to each other, a toothed segment adapted to be mounted in the door, a gear meshing with the segment and having means for manual rotation thereof, a radial arm on the segment, one of the first-named arms being slidably engaged in the slotted extension, and a link pivotally connected with the segment arm and with the other of the first-named arms.

In testimony whereof, I affix my signature.

NATHAN C. RAGSDALE.